(12) United States Patent
Sintek et al.

(10) Patent No.: US 9,096,280 B2
(45) Date of Patent: Aug. 4, 2015

(54) CAB HOLD DOWN SYSTEM

(71) Applicant: Pierce Pacific Manufacturing, Inc., Portland, OR (US)

(72) Inventors: Brad A. Sintek, Sandy, OR (US); Brandon K. Gray, Damascus, OR (US); Joseph B. Crover, Gresham, OR (US)

(73) Assignee: Pierce Pacific Manufacturing, Inc., Portland, OR (US)

( * ) Notice: Subject to any disclaimer, the term of this patent is extended or adjusted under 35 U.S.C. 154(b) by 4 days.

(21) Appl. No.: 14/256,669

(22) Filed: Apr. 18, 2014

(65) Prior Publication Data

US 2015/0115658 A1   Apr. 30, 2015

Related U.S. Application Data

(60) Provisional application No. 61/948,959, filed on Mar. 6, 2014, provisional application No. 61/898,353, filed on Oct. 31, 2013.

(51) Int. Cl.
*B62D 33/07* (2006.01)

(52) U.S. Cl.
CPC .................................. *B62D 33/071* (2013.01)

(58) Field of Classification Search
CPC ............................ B62D 33/071; B62D 33/067
USPC ........................... 296/190.04, 190.05, 190.06
See application file for complete search history.

(56) References Cited

U.S. PATENT DOCUMENTS

| 8,028,783 B2 * | 10/2011 | Rust ........................... 180/89.14 |
| 8,544,939 B2 * | 10/2013 | Klein et al. .............. 296/190.03 |
| 2004/0119320 A1 | 6/2004 | Albright et al. |

FOREIGN PATENT DOCUMENTS

| JP | 2005-329799 A | 12/2005 |
| KR | 10-1997-0065911 A | 10/1997 |
| KR | 10-2005-0064524 A | 6/2005 |
| WO | 2009-084856 A2 | 7/2009 |

OTHER PUBLICATIONS

Internet printout of Tandemloc High-Strength Vertical Clamp Connector (VI-SO), May 8, 2014, http://www.tandemloc.com/securing-high-strength-vertical-clamp-connector-K08A00D-1GA.asp.

* cited by examiner

*Primary Examiner* — Pinel Romain
(74) *Attorney, Agent, or Firm* — Schwabe, Williamson & Wyatt

(57) ABSTRACT

A system and apparatus to fasten a cab and riser to a heavy machine is described herein. A riser may include a frame that has therein a plurality of pivot pins. The pivot pins may have clamping elements coupled thereto. The respective distal ends of the clamping elements may be coupled to activation screws. When force is applied to a respective activation screw, a respective clamping element may rotate around a respective pivot pin to become clampingly engaged with a receiving structure on the heavy machine.

21 Claims, 4 Drawing Sheets

CAB HOLD DOWN SYSTEM

CROSS REFERENCE TO RELATED APPLICATIONS

This application claims priority under 35 U.S.C. §119(e) to U.S. Provisional Patent Application No. 61/898,353 entitled "Cab Hold Down System," filed Oct. 31, 2013, and U.S. Provisional Patent Application No. 61/948,959 entitled "Cab Hold Down System," filed Mar. 6, 2014, the disclosures of which are incorporated herein by reference.

FIELD

Embodiments relate generally to the technical field of heavy machinery, and more particularly, to systems for securing a cab to heavy equipment.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by the inclusion in this section.

Heavy equipment may include vehicles specifically adapted to perform construction operations, such as earthworks operations. Heavy equipment may be operated by a user that is proximate to the heavy equipment. For example, an operator may be within a cab that is coupled with heavy equipment. A cab may be secured to heavy equipment using four or eight bolts. These bolts are often twenty-five (25) millimeters or larger and require a high torque value to properly fasten the cab to the heavy equipment. Frequently, access to the fastening bolts is limited (e.g., visually and/or spatially) and, therefore, properly torqueing these bolts may be difficult. Consequently, cabs in the field may be fastened to heavy equipment with fewer bolts than intended and/or than required to pass certification testing.

BRIEF DESCRIPTION OF THE DRAWINGS

Various embodiments are illustrated by way of example and not by way of limitation in the figures of the accompanying drawings in which like references indicate similar elements. It should be noted that references to "an" or "one" embodiment of this disclosure are not necessarily to the same embodiment, and they may mean at least one.

FIG. 3A is a perspective view of a clamping apparatus that is not clampingly engaged with a receiving structure; and.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
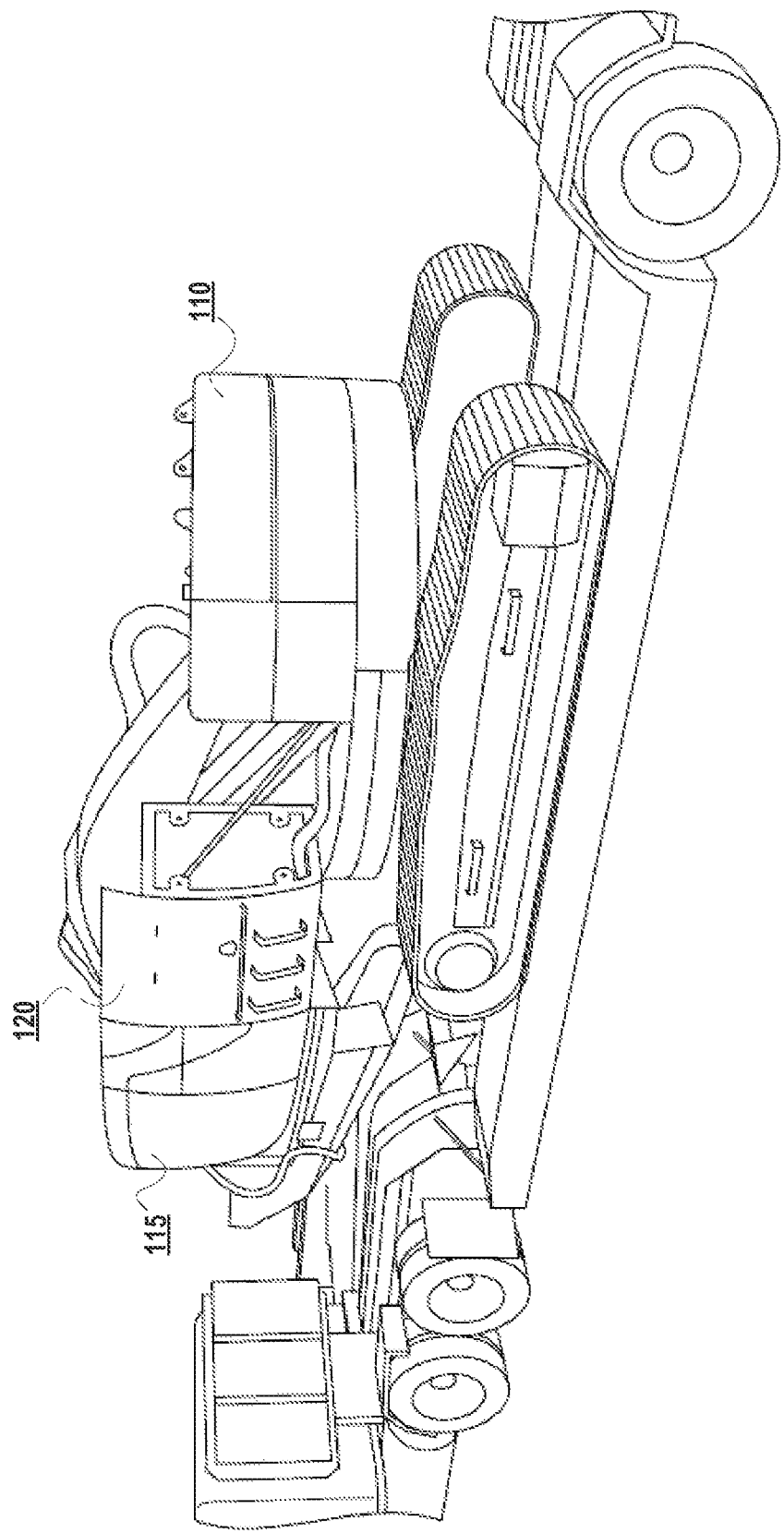
FIG. 1 is a perspective view of an excavator coupled with a cab and riser tilted for transport.

FIG. 1 illustrates a perspective view of an excavator 110 coupled to a cab 115 that includes a riser 120, in accordance with various embodiments. As illustrated in FIG. 1, the cab 115 and riser 120 may be tiltably coupled with the excavator 110. Frequently, the arrangement of an excavator 110 coupled with a cab 115 that utilizes a riser 120 may be too tall to transport without tilting the cab 115 and riser 120 into a transport position. In various embodiments, the cab 115 and riser 120 may be separately fabricated and/or separably coupled. Alternatively, the cab 115 and riser 120 may be regarded as two locations or sections of one element, such as a prefabricated element and/or inseparable element.

Upon arrival at a worksite, the cab 115 and riser 120 may be adjusted from the illustrated, tilted transport position to a work position in which the cab 115 and riser 120 are substantially upright (e.g., the cab 115 and riser 120 are substantially perpendicular to the excavator 110 and substantially parallel to a vertical axis.) The cab 115 and riser 120 may then be securely fastened in the upright position so that an operator may safely use the excavator 110 from the cab 115 (e.g., after entering through the riser 120).

Figure 2:
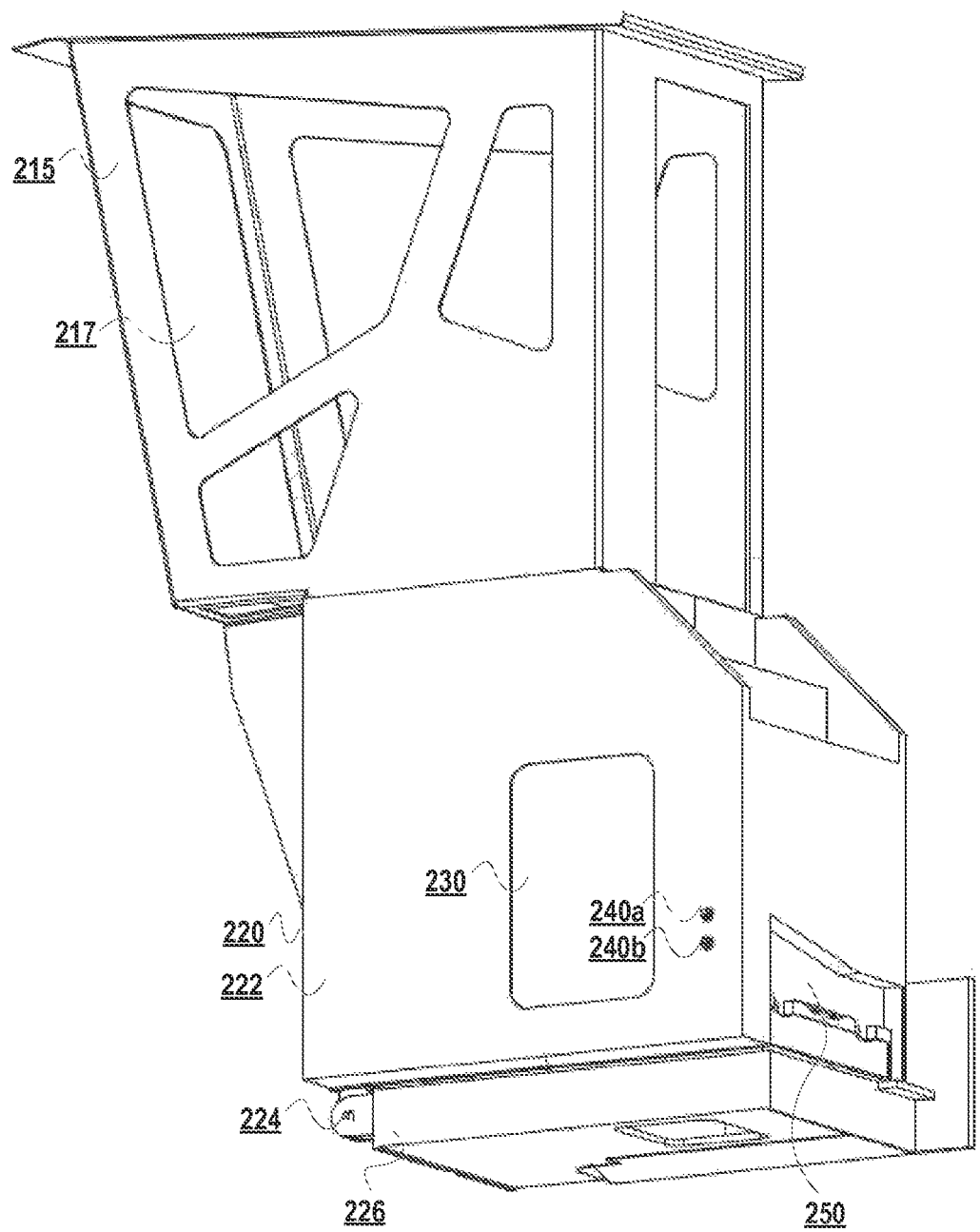
FIG. 2 is a perspective view of a cab and riser adapted to be fastened to a heavy machine.

FIG. 2 illustrates a perspective view of a cab 215 and riser 220 adapted to be coupled to a heavy machine, in accordance with various embodiments. In various embodiments, the cab 215 and the riser 220 may be the cab 115 and riser 120 shown in FIG. 1. The cab 215 and riser 220 may be tiltably coupled with a heavy machine (now shown), such as an excavator, backhoe, loader, or another similar heavy machine. In various embodiments, the cab platform 226 may be coupled with the heavy machine such that the cab 215 and riser 220 tilt about the tilt pivot 224 from the illustrated upright position to the tilt position shown in FIG. 1. The cab 215 may include one or more viewports 217 (e.g., a window, opening, etc.) that allow an operator positioned within the cab 215 to view outside. So that the operator may enter the cab 215 through the riser 220, the riser 220 may include an entry port 230.

According to embodiments, the riser 220 may include an arrangement of elements adapted to accommodate a system to fasten the cab 215 to a heavy machine. The riser 220 may include one or more openings 240a, b. The one or more openings 240a, b may be located on a side face 222 of the riser 220 and proximate to the cab platform 226. The one or more openings 240a, b may be adapted to accommodate a shaft or screw. In various embodiments, the one or more openings 240a, b may be angled, for example, at an angle between ten (10) and sixty (60) degrees. In such embodiments, a shaft or screw positioned through one of the one or more openings 240a, b may extend outside the side face 222 of the riser 220 at a commensurate angle.

According to embodiments, the one or more openings 240a, b may provide an inlet or channel through the side face 222 of the riser 220 to a cavity 250. The cavity 250 may be located on a rear face of the riser 220. The cavity 250 may be adapted to be coupled with a receiving structure (not shown) from a heavy machine. Further, the cavity 250 may be adapted to house an arrangement of elements that is to fasten the cab 215 and riser 220 to the heavy machine. For example, the cavity 250 may have stored therein a frame, one or more activation screws, one or more clamping bars, and one or more pivot pins that aggregately are adapted to clampingly engage the clamping bars with the receiving structure of the heavy machine when torque is applied to the activation screws.

As illustrated, the arrangement of the one or more openings 240a, b and the cavity 250 may be an element of the riser 220. Alternatively, the arrangement of the one or more openings 240a, b and the cavity 250 may be coupled to the riser 220 as an adapter. In another embodiment, the one or more openings 240a, b and the cavity 250 may be an element of the heavy machine or coupled thereto as an adapter. In such an embodiment, the receiving structure that the cavity 250 is adapted to receive may be an element of and/or coupled with the riser 220.

Figure 3A:
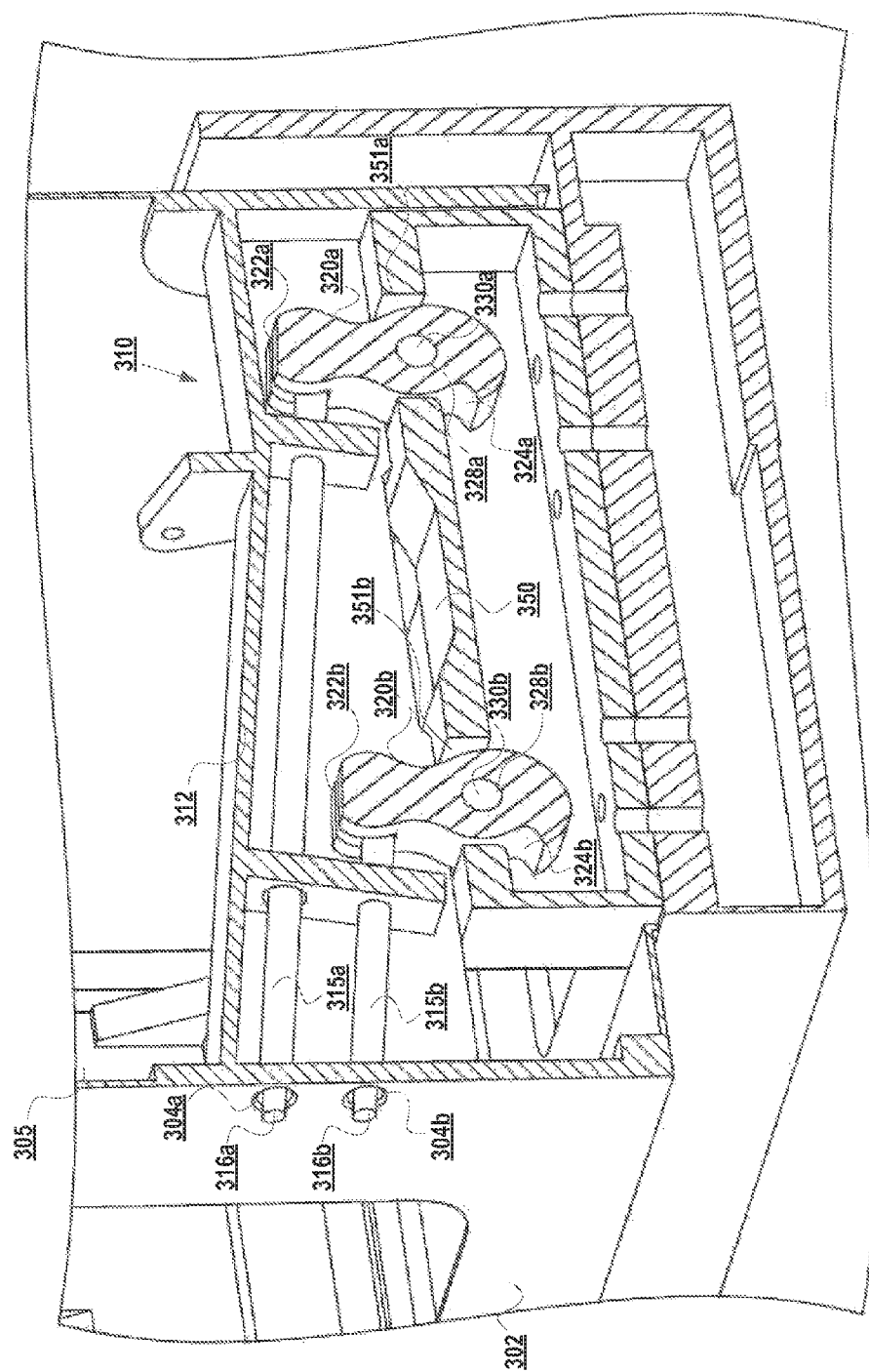

FIG. 3A illustrates a perspective view of a clamping apparatus 310 to securely couple a cab and riser to a heavy machine, in accordance with various embodiments. In FIG. 3A, a riser having a cavity 305 may be coupled with a heavy machine having the receiving structure 350. In various embodiments, the cavity 305 may be the cavity 250, and the side face 302 having openings 304a, b may be the side face 222 of the riser 220 having openings 240a, b shown in FIG. 2. In the illustrated embodiment, the clamping apparatus is not clampingly engaged with the receiving structure 350, and therefore a cab and/or riser may not be securely coupled to a heavy machine by the clamping apparatus 310.

When a cab and/or riser is uprightly positioned on a heavy machine, the clamping apparatus 310 may contact the heavy machine so that the receiving structure 350 of the heavy machine receives the clamping apparatus 310. The clamping apparatus 310 may include components that are sufficient to securely fasten a cab and riser to a heavy machine. For example, the frame 312 and/or at least one of the pluralities of components 315-330 may be steel, aluminum, titanium, or any other substantially rigid material, including composite materials and/or alloys.

The clamping apparatus 310 may include a plurality of components 315-330 that are housed and/or supported by a frame 312. In embodiments, the clamping apparatus 310 may include one or more activation elements 315a, b. An activation element 315a may be, for example, a substantially cylindrical bar. The activation element 315a may be adapted to have force applied at a distal end 316a. In various embodiments, the activation element 315a may be a screw. Accordingly, the distal end 316a of the activation element 315a may be adapted to receive a torque force, such as from a wrench or screwdriver. For example, in some embodiments, the distal end 316a may include a hexagonal head and/or grooves adapted to receive a screwdriver. In other embodiments, the distal end 316a of the activation element 315a may be adapted to receive other suitable means of torque force, such as a wrench, power driver, etc.

In various embodiments, the activation element 315a may extend beyond the frame 312 and through an opening 304a of the side face 302. In this arrangement, the activation element 315a may receive a force at the distal end 316a outside of a cab, riser, and/or heavy machine. For example, a cab and riser may be uprightly positioned on a heavy machine in a working position and the distal end 316a of the activation element 315a may receive force applied by a user with a power tool or conventional hand tool (e.g., a screwdriver or torque wrench) without the need for the user to inconveniently maneuver around the cab, riser, and heavy machine to access a plurality of bolts. In embodiments having a plurality of activation elements 315a, b, the second activation element 315b may be similar to the first activation element 315a, although various dimensions, positions within the frame 312, and/or other characteristics may vary.

At a proximal end (opposite the distal end 316a), the activation element 315a may be coupled with a proximal end 322a of a clamping element 320a (e.g., a clamping bar). Opposite the proximal end 322a, the distal end of the clamping element 320a may include a protrusion 324a. Protrusion 324a may be adapted to clampingly engage with the receiving structure 350 when in contact therewith. When a cab and/or riser is uprightly positioned on a heavy machine, the clamping element 320a may be positioned in an opening 351a of the receiving structure 350.

Toward an approximate center of the clamping element 320a is an opening 328a. The opening 328a of the clamping element 320a may be adapted to receive a pivot pin 330a. In various embodiments, the pivot pin 330a may be part of the frame 312. The clamping element 320a may be adapted to rotate about the pivot pin 330a. As the clamping element 320a rotates about the pivot pin 330a, the protrusion 324a at the distal end of the clamping element 320a may commensurately shift in position in the frame 312 and in relation to the receiving structure 350.

Figure 3B:
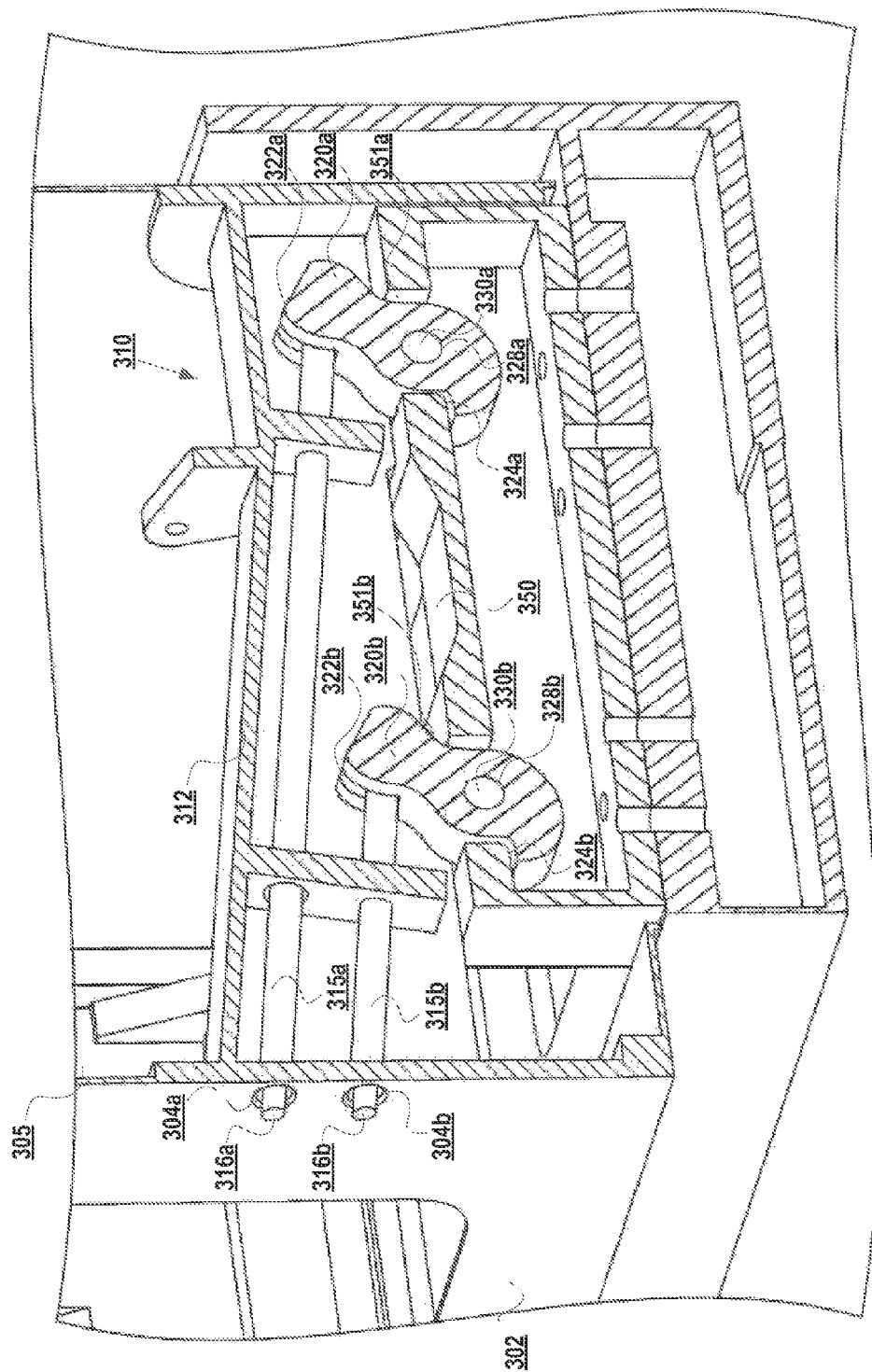
FIG. 3B is a perspective view of a clamping apparatus that is clampingly engaged with a receiving structure, in accordance with various embodiments; all in accordance with various embodiments.

FIG. 3B illustrates a perspective view of the clamping apparatus 310 to securely couple a cab and riser to a heavy machine, in accordance with various embodiments. In the illustrated embodiment of FIG. 3B, the clamping apparatus is clampingly engaged with the receiving structure 350, and therefore a cab and/or riser may be securely fastened to a heavy machine by the clamping apparatus 310. When a cab and/or riser is uprightly positioned on a heavy machine, the clamping element 320a may be positioned in an opening 351a so that the clamping element 320a may clampingly engage with the receiving structure 350.

In the illustrated clamping engagement arrangement, the protrusion 324a of the clamping element 320a may contact the receiving structure 350. To ensure that a cab and/or riser is securely coupled to a heavy machine, this contact may be suitably firm and sturdy to avoid any slippage. That is, the clamping engagement of the protrusion 324a with the receiving structure may prevent the clamping element 320a from disengaging the receiving structure 350 through the opening 351a.

To effect this clamping engagement, force may be applied to the distal end 316a of the clamping element 320a. The applied force may cause the activation element 315a to apply a second force to the clamping element 320a at the proximal end 322a. This second force applied by the activation element 315a may cause the clamping element 320a to rotate about the pivot pin 330a until the clamping element 320a is clampingly engaged with the receiving structure 350.

In various embodiments, the activation element 315a may be an angularly positioned screw within the frame 312. A torque force may be applied to the distal end 316a of the activation element 315a, and the applied torque force may cause the proximal end of the activation element 315a to apply a linear force to the proximal end 322a of the clamping element 320a. The applied linear force may drive the proximal end 322a of the clamping element 320a away from the side face 302. As the proximal end 322a is driven by the linear force, the clamping element 320a may rotate in the opening 351a of the receiving structure 350 around the pivot pin 330a at the opening 328a. The rotational force may drive the protrusion 324a toward the receiving structure 350 (e.g., toward a bottom face or surface of the receiving structure 350). The protrusion 324a may then contact the receiving structure 350 and be clampingly engaged therewith. Additional force may continue to be applied to the activation element 315a even where the protrusion 324a is in contact with the receiving structure 350 to increase the clamping engagement effected between the protrusion 324a and the receiving structure 350. Accordingly, the clamping apparatus 310 may secure a cab and riser to a heavy machine.

In embodiments wherein the clamping apparatus 310 includes a plurality of clamping elements 320a, b, the second clamping element 320b may be similar to the first clamping element 320a, although various dimensions, positions within the frame 312, and/or other characteristics may vary. In such embodiments, the frame 312 may include a second pivot pin 330b. The second clamping element 320b may be coupled with the second activation element 315b and rotate around the pivot pin 330b to effect movement of the protrusion 324b of the second clamping element 320b. Further, the second clamping element 320b may be received at a second opening 351b of the receiving structure 350. The mechanism of action to clampingly engage the second clamping element 320b with the receiving structure 350 through the opening 351b may be similar to that described with respect to the first clamping element 320a. The addition of at least one other clamping element 320b may improve the coupling provided by the clamping apparatus 310.

According to various embodiments, the locations of the clamping apparatus 310 and the receiving structure 350 may be reversed. For example, the receiving structure 350 may be included in a riser or cab (e.g., as a fabricated component or adapter), whereas the clamping apparatus 310 may be included in a heavy machine (e.g., as a fabricated component or adapter).

In the foregoing Specification, embodiments of the disclosure have been described with reference to specific exemplary embodiments thereof. It will be evident that various modifications can be made thereto without departing from the broader spirit and scope of the disclosure as set forth in the following claims. The Specification and drawings are, accordingly, to be regarded in an illustrative sense rather than a restrictive sense.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. An apparatus for securing a cab to a heavy machine when the cab is uprightly positioned on the heavy machine, the apparatus comprising:
   a frame adapted to contact a receiving structure when the cab is uprightly positioned on the heavy machine,
   a plurality of clamping elements coupled with the frame, each respective clamping element adapted to rotate about a respective pivot point on the frame and clampingly engage the receiving structure to fasten the cab to the heavy machine; and
   plurality of activation elements, each respective activation element coupled to a respective clamping element inside the frame, wherein each respective activation element is adapted to cause the respective clamping element to clampingly engage with the receiving structure in response to force applied to the respective activation element.

2. The apparatus of claim 1, further comprising:
   a plurality of pins, included in the frame, a respective pin adapted to provide the respective pivot point for the respective clamping element.

3. The apparatus of claim 2, wherein the respective clamping element comprises:
   a coupling element adapted to couple the respective clamping element with the respective activation element;
   an opening adapted to receive the respective pin; and
   a protrusion adapted to contact the structure when the respective clamping element is clampingly engaged with the structure.

4. The apparatus of claim 3, wherein the respective activation element is coupled with the coupling element of the respective clamping element at a proximal end of the activation element and the respective activation element is adapted to have the force applied to a distal end of the respective activation element.

5. The apparatus of claim 4, wherein the distal end of the respective activation element is adapted to have receive at least one of a screwdriver and a wrench.

6. The apparatus of claim 4, wherein the respective activation element is a screw adapted to receive a torque force at the distal end and apply a linear force to the respective clamping element at the proximal end.

7. The apparatus of claim 3, wherein the plurality of clamping elements are adapted to be positioned in a plurality of openings in the structure, the protrusion of the respective clamping element to contact an underside face of the receiving structure proximate to a respective opening in which the respective clamping element is positioned.

8. The apparatus of claim 1, wherein the receiving structure is included in the heavy machine and the frame, the plurality of activation elements, and the plurality of clamping elements are coupled to the cab via a riser.

9. The apparatus of claim 1, wherein the receiving structure is coupled to the cab via a riser and the frame, the plurality of activation elements, and the plurality of clamping elements are included in the heavy machine.

10. The apparatus of claim 1, wherein a distal end of the respective activation element, adapted to receive the force, is to be positioned outside of the frame.

11. An apparatus, the apparatus comprising:
   a clamping element adapted to rotate about a pivot point and clampingly engage a structure to uprightly fasten a cab to a heavy machine; and
   an activation element, coupled with the clamping element, adapted to cause the clamping element to rotate about the pivot point to clampingly engage with the structure when force is applied to the activation element.

12. The apparatus of claim 11, wherein the activation element is coupled with the clamping element at a proximal end of the activation element and the activation element is adapted to have the force applied to a distal end of the activation element.

13. The apparatus of claim 12, further comprising:
   a frame adapted to accommodate the clamping element and the activation element, wherein the distal end of the activation element is to extend outside of the frame.

14. The apparatus of claim 11, wherein the heavy machine includes the structure and the clamping element and the activation element are coupled with the cab, the activation element to extend through a side face of the cab to receive the force outside of the cab.

15. The apparatus of claim 11, wherein the cab includes the structure and the clamping element and the activation element are coupled with the heavy machine, the activation element to extend through a side face of the heavy machine to receive the force outside of the heavy machine.

16. The apparatus of claim 11, wherein the clamping element includes an opening adapted to receive a pivot pin that is the pivot point about which the clamping element is adapted to rotate.

17. The apparatus of claim 11, wherein the activation element is a screw and the force is torque.

18. The apparatus of claim 11, wherein the clamping element includes a protrusion adapted to clampingly engage with the structure.

19. A system for securing a cab to a heavy machine, the system comprising:
   a frame having a plurality of extensions;
   a plurality of clamping elements coupled with the frame, a respective clamping element adapted to rotate about a respective extension and clampingly engage a structure to fasten the cab to the heavy machine; and
   a plurality of activation elements, a respective activation element coupled with the respective clamping element, wherein the respective activation element is adapted to cause the respective clamping element to clampingly engage with the structure when the respective activation element receives a force.

20. The system of claim 19, wherein the respective activation element is a screw.

21. The system of claim 19, wherein the respective activation element is to extend outside of the frame.

* * * * *